INVENTOR
K. D. BOWERS
ATTORNEY

Nov. 18, 1969     K. D. BOWERS     3,479,651
LAMINATE OPTICAL MEMORY WITH SELECTIVE ERASE
Filed March 24, 1966     3 Sheets-Sheet 3

United States Patent Office 3,479,651
Patented Nov. 18, 1969

3,479,651
LAMINATE OPTICAL MEMORY WITH
SELECTIVE ERASE
Klaus D. Bowers, Summit, N.J., assignor to Bell Telephone Laboratories, Incorporated, New York, N.Y., a corporation of New York
Filed Mar. 24, 1966, Ser. No. 537,095
Int. Cl. G11b 9/00; G02f 1/26; G01n 21/30
U.S. Cl. 340—173                12 Claims

ABSTRACT OF THE DISCLOSURE

An optical store comprising a photoconducting layer, a polarizing layer, and an electrooptic layer along with means for selectively applying voltage across selected positions in the electrooptic layer for rotating accessing polarized light for passage through the polarizing layer is adapted to selective erasure. An erase circuit includes X and Y conductors which operate to reduce the voltage across the electrooptic layer selectively.

---

This invention relates to optical memories and, more particularly, to improvements in optical memories including photoconductive film (PC)-polarizing film (P)-electrooptic (EO) film sandwich structures of the type disclosed in copending application Ser. No. 516,031, filed Dec. 23, 1965 for S. K. Kurtz.

The aforementioned application describes an optical memory wherein a voltage is impressed across the sandwich structure described above. Light from a digital light deflector (the illuminated condition) is directed at a selected location on the photoconductive film reducing the resistance of the film and thus applying the voltage at that location essentially across the electrooptic film. A broad beam of polarized light is incident on all locations on the electrooptic film. The polarization direction of the polarizing film, however, is chosen orthogonal to that of the broad beam. Consequently, the unilluminated condition is characterized by the absence of light from the broad beam at all the locations on the photoconductive film. When "selection" light causes the above noted voltage to be applied across the electrooptic material, the light from the broad beam incident to that location has the polarization direction thereof rotated to a direction for passing through the polarizing film there. Thus light (from the broad beam) issues from a location selected by light from the digital light deflector indicating the storage of a binary one. Suitable shuttering of input light to the digital light deflector during a selection operation permits the storage of a binary zero characterized by the absence of light at the selected location.

Information is erased from the foregoing memory by reducing the voltage across the electrooptic material.

An object of this invention is to provide a new and novel optical memory including a PC-P-EO sandwich structure.

A further object of this invention is to provide new and novel means for erasing information from that sandwich structure.

The foregoing and further objects and features of this invention are realized in one embodiment thereof wherein first and second orthogonal sets of conductors are arranged on the PC and EO films of the aforedescribed storage unit respectively. Each conductor includes a photoconductor portion and a resistance, and a potential difference is provided between the two sets of conductors. When the photoconductors of coordinate pairs of conductors are illuminated, the potential difference through the corresponding portion of the electrooptic material is reduced and the light (broad beam) passed at that point is, essentially, extinguished.

Digital light deflectors suitable for accessing the aforedescribed storage unit are well known. Such a deflector comprises a multistage optical system wherein each stage includes a modulator and a deflector. The function of the modulator is to change the polarization direction of incoming light from a first to a second direction according to the voltage signal thereacross. The function of the deflector is to direct outgoing light, for example, at a first or second angle for the first and second direction of polarization respectively.

Succeeding stages of such a deflector are arranged to cause X and Y deflections in order to define a matrix of locations on a storage unit positioned at the image plane of a lens focusing the light output of such a deflector. The optical elements of the digital light deflector differ in thickness (along the optical path), in a well-known manner, in order to avoid overlapping of accessing positions. The height and width (in a plane orthogonal to the optical path) of those elements, however, are alike.

It has been found advantageous in accordance with this invention to have the Y dimension of the optical elements, in those stages providing an X deflection, larger than the corresponding dimension of the optical elements in the stages providing X deflection. Similarly, it has been found advantageous in accordance with this invention to have the X dimension of the optical elements, in those stages providing a Y deflection, larger than the corresponding dimension of the optical elements in the stages providing Y deflection. In this manner, the photoconductor portions of the orthogonal sets of X and Y "erase" conductors are accessed most conveniently in accordance with this invention.

Accordingly, a feature of this invention is a PC-P-EO sandwich structure including orthogonal sets of X and Y conductors each including a photoconductor portion and a resistor therein and means for normally maintaining a potential difference between the sets of conductors.

Another feature of this invention is a digital light deflector including a plurality of X and Y deflection stages therein wherein the dimension of the optical elements not corresponding to the direction of deflection of the stage is relatively large.

The foregoing and further objects and features of this invention will be understood from a consideration of the following detailed description rendered in conjunction with the accompanying drawing, in which.

Optical memories in accordance with this invention may be operated in the reflecting or, alternatively, transmitting mode. In the reflecting mode the detection apparatus is situated on the same side of the storage plane as the selection apparatus. This mode is described in detail in the aforementioned copending application for a memory employing the described sandwich structure as the storage plane. In the transmitting mode the detection apparatus and the selection apparatus are on opposite sides of the storage plane. The transmitting mode of operation is described in detail herein. It is to be understood that the arrangement described is merely illustrative and the reflecting mode of operation is realizable also in accordance with this invention.

Figure 1:
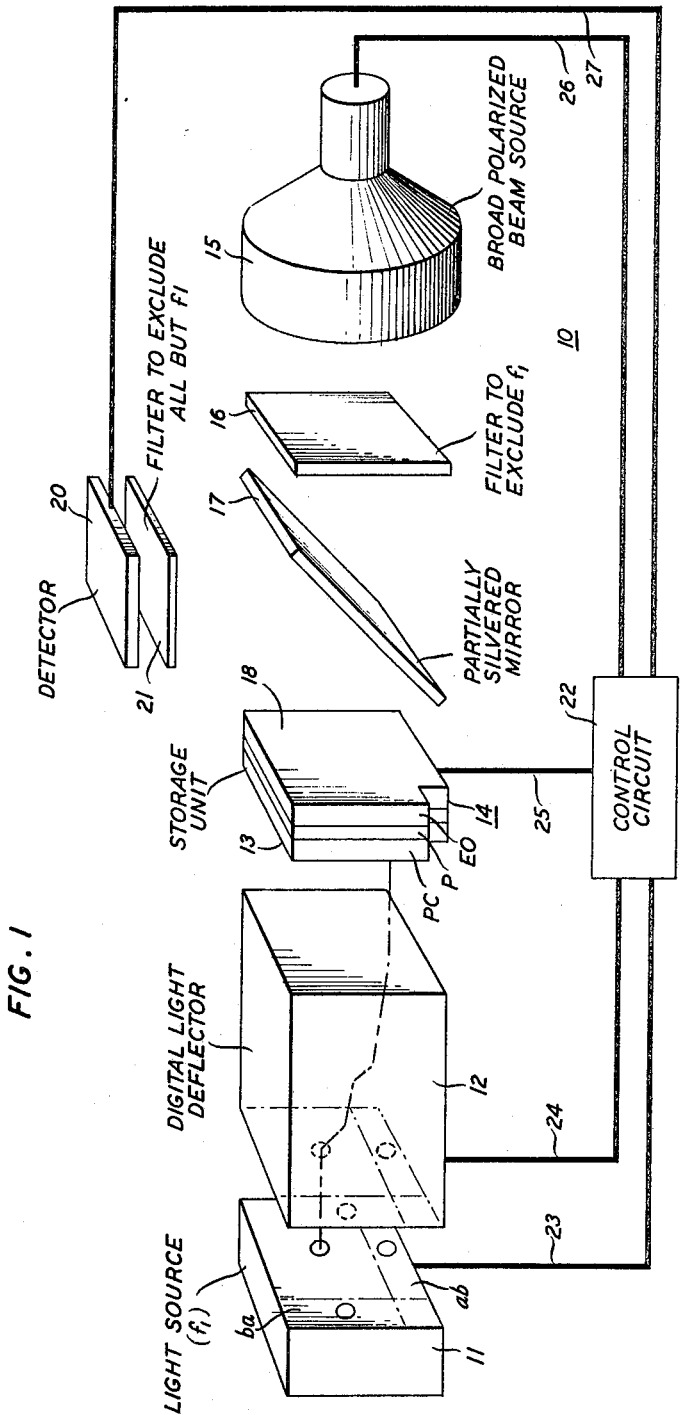
FIG. 1 is a block diagram of an optical memory in accordance with this invention.

FIG. 1 shows an optical memory system 10 in which light (broadly electromagnetic radiation) of a frequency $f1$, provided from a suitable source 11 typically a laser, is directed through a digital light deflector 12 at a first side 13 of storage unit 14. The light from source 11 is referred to as selection light herein. A source 15 directs a broad polarized beam of light through an $f1$ filter 16, through a partially silvered mirror 17 at a second side 18 of storage unit 14.

A detector 20 is positioned adjacent partially silvered mirror 17 to detect all light of a frequency $f1$ issuing from side 18 of storage unit 14. A filter 21 is positioned between detector 20 and partially silvered mirror 17 to eliminate all light of a frequency other than $f1$.

Source 11, deflector 12, storage unit 14, source 15, and detector 20 are connected to a control circuit 22 by means of conductor symbols 23, 24, 25, 26, and 27, respectively. The various sources, deflectors, detectors, and circuits herein may be any such elements capable of operating in accordance with this invention.

It should be made abundantly clear at the outset that the present invention has a variety of aspects which are not only novel in and of themselves but which combine to provide a novel optical memory system. Specifically, the storage unit 14 in accordance with this invention includes a structural arrangement which permits selective erasure of selected information in a random access fashion. That structural arrangement of the storage unit is arranged to take advantage of a simple accessing implementation provided by a modification of the geometry of the optical elements in the digital light deflector. In turn, the geometrical modification of those optical elements provides a digital light deflector most easily accessed by a modified source of selection light.

FIG. 1 shows the over-all optical memory system in accordance with this invention. FIGS. 2 through 6 show, in greater detail, the storage plane, the digital light deflector, and the output of the source of selection light. It is helpful to consider the individual elements of the memory system of FIG. 1 before considering an illustrative operation of the system itself. Those elements and the operation thereof are most easily understood in a general operational framework, however. Accordingly, a general description of the operation of the system of FIG. 1 is provided first, the various elements and the function of those elements in the system of FIG. 1 are discussed thereafter; and finally an illustrative operation of the system including those specific elements is described.

We are considering a transmitting mode of operation. Thus, detector 20 of FIG. 1 registers light of frequency $f1$ from source 11 which is passed by storage unit 14. The selected location of storage unit 14 is a function of the presence or absence of a signal voltage across each of the succeeding stages of the digital light deflector 12 as is well known. Thus a given code of signal voltages in the digital light deflector routes selection light $f1$ to a preselected position on the storage unit 14. That light decreases the resistance of the photoconductive film PC at the selected location and a voltage normally maintained between the X and Y conductors of the storage unit (see FIG. 2) is impressed across the electrooptic film there.

As has been stated hereinbefore, the polarization directions of the polarizing film P of the storage unit and the light from source 15 are orthogonal. Thus, no light from source 15 reaches the photoconductive film PC normally. When selection light lowers the resistance of a selected location on the photoconductive film impressing the voltage across the corresponding location on the electrooptic film, the polarization direction of light from source 15 is rotated to a direction such that light therefrom is passed by polarizing film P. That light which is so passed sustains the low resistance "aperture" in photoconductive film PC. Selection light now may be redirected to select another location. Importantly, a plurality of locations are accessed and, in response, a voltage is impressed across corresponding portions of the electrooptic film. And the light from source 15 sustains the voltage at each location afteh the selection light is extinguished. If, during a selection operation, selection light is, for example, shuttered by well known shuttering means not shown, the voltage at the selected location is not impressed across the corresponding portion of the electrooptic film EO.

During a read operation, light (of reduced intensity) from source 11 is directed at a selected location as dictated by the inputs to the digital light deflector 12 under the control of control circuit 22. If light from source 15 is sustaining the low resistance of the photoconductive film PC at the selected location, light of frequency $f1$ passes the storage unit at that location and is (partially) reflected by mirror 17 to detector 20 which so indicates the presence of the light under the control of control circuit 22. The presence of the light at a selected location may be taken to indicate a stored binary one. If, on the other hand, light from source 15 is not sustaining the low resistance of the storage unit at the selected location, light of frequency $f1$ is not so passed and detector 20 indicates a null. The null indication may be taken as a stored binary zero.

Detector 20 thus indicates whether or not storage unit 14 passes light from source 11 at a selected location. It is clear that a transmitting mode of operation is described. Just as well, detector 20 could have been positioned on the same side of storage unit 14 as source 11. In this instance, detector 20 would detect the passage of light from source 15 at a selected bit location determined by the input setting of deflector 12. The latter operation is a reflection mode consistent with that described in the aforementioned copending application.

We have now completed a general description of the operation of the memory system of FIG. 1 and are in a position to understand the more detailed description of the various elements in accordance with this invention.

Figure 2:
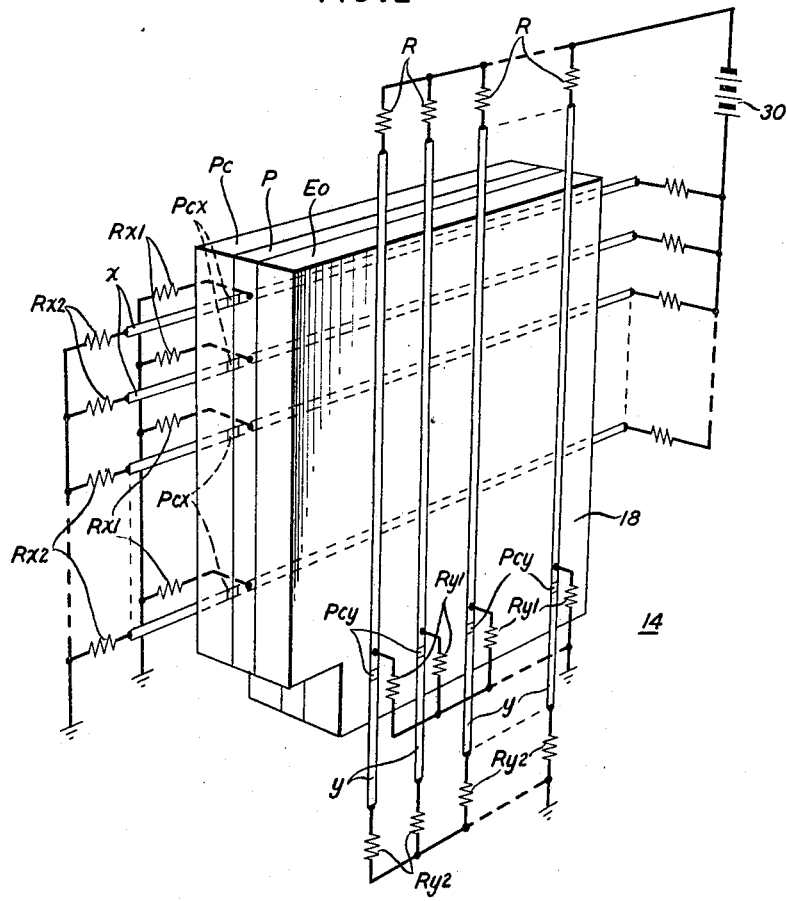
FIG. 2 is a schematic illustration of an optical memory plane, in accordance with this invention, for the memory of FIG. 1.

FIG. 2 shows the structure of the storage unit 14 comprising an electrooptic film EO, a polarizing film P, and a photoconductive film PC bounded by X and Y conductors in accordance with this invention. The storage unit is oriented as in FIG. 1, the side 18 facing as viewed. Vertically oriented Y conductors are shown on side 18; horizontal X conductors are positioned on the side 13 of the storage unit hidden from view. The bit locations in the storage unit are as crosspoints between coordinate X and Y conductors and the conductors are transparent or conveniently, apertured at the crosspoints to permit light passage therethrough. A voltage source 30 normally impresses a potential difference between the X and Y conductors. Consequently, a voltage drop is normally impressed across the storage unit at each location. As described hereinbefore, when a location is selected, that voltage appears across the electrooptic film at the selected location and the polarization direction of light from source 15 is appropriately rotated.

Normally, the voltage difference between cooordinate X and Y conductors is determined by the resistance of the conductor itself plus the values of corresponding series resistors RX1 and RY1 which are connected to ground. The photoconductors PCY and PCX, comprising a part of the Y and X conductors respectively, appear as open circuits normally. Second resistors RX2 and RY2, connected in series with the photoconductors in the X and Y conductors respectively, terminate at ground. When coordinate PCY and PCX photoconductors are accessed, the resistance in series with the corresponding X and Y conductors is reduced and the voltage difference across the electrooptic film at the corresponding location in turn is reduced to below a sustaining threshold described in the aforementioned copending application. Consequently, light is "extinguished" at that location.

The reduction of the sustaining voltage during an erase operation can be put on a more analytical basis. With no light incident on the photoconductor areas of coordinate conductors, the voltage on the Y conductor is $$V \frac{RY1}{R+RY1}$$

where V is the applied voltage (from source 30), and R is a resistance connected between each of the X and Y conductors and source 30, resistance RY1 is assumed much larger than R, and the resistance of the Y conductor is assumed negligible. Similarly, the voltage on an X conductor is $$V \frac{RX1}{R+RX1}$$

With light incident on a photoconductor in a Y conductor, the voltage on that conductor is reduced to $$V \frac{1}{R\left(\frac{1}{RY2}+\frac{1}{RY1}\right)+1}$$

where RY2 here actually includes the resistance of the corresponding photoconductor. If RY2 is much less than RY1 then the voltage becomes $$V \frac{RY2}{R+RY2}$$

thus specifying the relative values of the resistances. The absolute values are dictated by the compromise between low power dissipation (high resistances) and fast circuit responses (low resistances). The illuminated voltage on a coordinate X conductor is shown similarly as $$V \frac{RX2}{R+RX2}$$

The resistance RY2 may be specified as the illuminated resistance of a photoconductor PCY. The resistance RY1 may be taken as the dark resistance. Values of $10^6$ ohms and $10^3$ ohms, respectively, are satisfactory. Many semiconductor materials provide such resistances. If such semiconductor materials are employed, resistors RX1, RY1, RX2, and RY2 as shown in FIG. 2 may be omitted. Regardless of whether those resistances are supplied by the photoconductor or supplied separately, by choosing the RX1 and RY1 resistances relatively low and the RX2 and RY2 resistances relatively high, it is clear that the voltage difference across the selected bit location may be reduced to below a sustaining level as described in the aforementioned copending application.

Figure 3A:
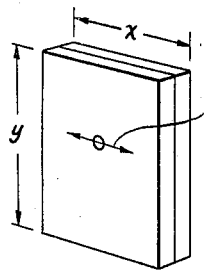
FIGS. 3A, 3B and 5 are schematic illustrations of a portion of a digital light deflector, in accordance with this invention, for the optical memory of FIG. 1.
Figure 3B:
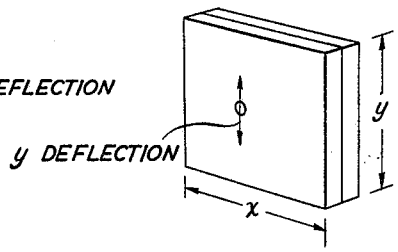
Figure 4:
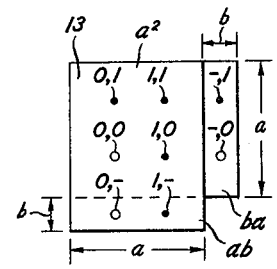
FIGS. 4 and 6 are displays of the output light positions from and the selection light input to the portion of a digital light deflector shown in FIG. 5.

Now how do we access the photoconductors PCX and PCY? This question is answered in connection with FIGS. 3A, 3B, 4, and 5. FIGS. 3A and 3B show two adjacent stages of a digital light deflector in accordance with this invention. Those states and the storage unit of FIG. 4 are oriented as viewed from the light source 11 of FIG. 1. The stage of FIG. 3A provides an X deflection. That is to say, light directed at the circle in FIG. 3A is deflected along the horizontal axis, as indicated by the so oriented double-headed arrow, if a signal voltage is present across the stage. The means for so providing the voltage is well known in the art and, accordingly, is neither shown nor discussed further herein. In accordance with this invention, the Y (vertical) dimension of optical elements in the X deflection stages of a digital light deflector is larger than the X (horizontal) dimension of those elements.

Similarly, FIG. 3B shows a Y deflection stage wherein light directed at the circle there is deflected vertically if a signal voltage is present. The X dimension of a Y deflection stage is larger than the corresponding Y dimension. Accordingly, optical elements for a digital light deflector in accordance with this invention are rectangular. Typical dimensions are 11 millimeters times 10 millimeters.

Figure 5:
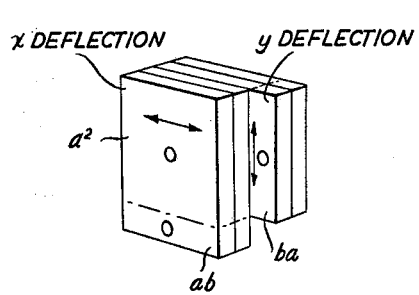

Two succeeding stages of a digital light deflector are shown, without electrodes or other means for applying voltages thereacross, in FIG. 5. FIG. 4 shows a corresponding display of possible output positions for a two-stage illustrative arrangement. We may think of the storage unit as comprising three distinct areas, a first designated $a^2$, a second designated $ab$, and a third designated $ba$.

If light is normally directed at the position of the circle in area $a^2$ in FIG. 5, which we may take as the same position as the circle in area $a^2$ of FIG. 4, no signal voltage on either the X or Y stage permits light to pass undeflected. This signal voltage condition we may define as a 0, 0 condition. If a signal voltage is present across the X stage, light is moved to the right as viewed in FIG. 4 to a spot appropriately designated 1, 0. If a signal voltage is present on only the second stage, selection light is deflected vertically to the spot designated 0, 1. And if signal voltages are maintained on both X and Y stages, selection light is deflected horizontally to the right and verticaly to a spot designated 1, 1.

Figure 6:
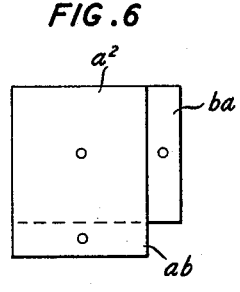

A write operation (and a read operation, alternatively) then occurs in response to a light beam from source 11 of FIG. 1 directed at a position indicated as a circle in area $a^2$ of FIGS. 4 and 6. The nature of this light and the intensity thereof are consistent with that specified in the aforementioned copending application.

FIG. 6 depicts the output of source 11 and shows two other circles in addition to the one shown in area $a^2$. One of those circles is in area $ab$, the other in area $ba$. The circles are shown also in FIGS. 4 and 5. It is clear that selection light directed at the circle in area $ab$ of FIG. 4 (the lower circle in the X deflection stage as represented in FIG. 5) is deflected to the right if a signal voltage is applied across the X stage during the accessing operation. The spot to which the light is deflected is designated the 1, – spot in FIG. 4. It is noted that light so directed does not pass through the optical elements of any Y deflection stages. Similarly, light directed at the circle in area $ba$ of FIG. 4 is deflected vertically to a spot designated –, 1 in FIG. 4 if the Y deflection stage has a signal voltage thereacross. Note also that light so directed does not pass through any X deflection stages. Of course, light directed at the circle in area $ab$ or in area $ba$ need not be so deflected in which case the light remains in a direction indicated by those circles which may, accordingly, be designated the 0, – and –, 0 positions, respectively. Light from source 11 is directed in the positions indicated by the circle in areas $ab$ and $ba$ of FIG. 6 during an erase operation. Light from source 15 is prevented from reaching areas $ba$ and $ab$ to avoid illuminating photoconductors PCY. This is accomplished conveniently by covering those areas with opaque material.

Crosspoints between the X and Y conductors of the storage unit 14 correspond to the circle and dots of area $a^2$ of FIG. 4. Photoconductors on the X conductors correspond to the dot and circle of the area $ba$ in FIG. 4. Of course, in practice the digital light deflector includes many stages and the crosspoints and photoconductors correspond to each of the circles and dots formed as illustrated above. The correspondence between the Y photoconductors and the X deflection and, alternatively, the X-photoconductors and the Y deflection is made to emphasize that the longer dimension of the optical element in an X deflection stage is the Y dimension and, vice versa, the longer dimension in a Y deflection stage is the X dimension.

It is to be understood that the description of the deflection of light in a digital light deflector herein is intended to represent path displacement and angular displacement of light, both well-known modes of optical deflection.

The light source 11 of FIG. 1 includes three circles thereon. Those circles are intended to correspond to the circles of FIG. 6. Light from source 11 may be directed through the circle of area $a^2$ or, alternatively, through the circles of areas *ab* and *ba* together by including in light source 11 a single stage of a digital light deflector with a "fly's eye" lens associated with one position of the output of that stage for splitting the image and thus directing light at the circles of areas *ab* and *ba* simultaneously. A fly's eye lens suitable in this connection is disclosed in copending application Ser. No. 437,770, filed Mar. 8, 1965 for W. J. Tabor, now Patent No. 3,438,692. Source 11 provides a beam of light in the position of the circle reducing the intensity of light issuing from source 11 during a read operation because otherwise a beam of "write" intensity will always write a binary one even during a read operation as will become clear in the following illustrative operation.

The illustrative operation comprises the writing, reading, and erasure of a binary one and a binary zero in the 0, 1 and 1, 1 locations as designated in FIG. 4. In accordance with the illustrative operation, light source 11 provides a beam of light in the position of the circle in area $a^2$ of FIG. 4 under the control of control circuit 22. The inputs to the digital light deflector 12 of FIG. 1 (as in FIG. 5) are 0 and 1 also under the control of control circuit 22. Consequently, selection light is routed to the location 0, 1 in the storage unit 14. The voltage source 30 and the corresponding X and Y conductors, transparent or apertured of course, maintain a voltage across the selected location. That voltage is essentially across the photoconductive film PC at that location. Selection light, however, reduces the resistance of the photoconductive film there and the voltage is applied (essentially) across the electrooptic film. Light from source 15, under control of control circuit 22 maintains the resistance of the photoconductive film low at the selected location.

The input to the digital light deflector is now changed to 1, 1 and the source 11 is suitably shuttered for interrupting light thus storing a binary zero. No light is incident at this selected location and so light from source 15 is not permitted to reach photoconductive film PC at that location. The write operation is now complete and selection light from source 11 may be extinguished under the control of control circuit 22.

Light intensity of a selection beam from source 11 is reduced, illustratively, for a read operation to below a value requisite for writing in the storage unit 14 of FIG. 1. The values required are consistent with those discussed in the aforementioned copending Kurtz application. The particular location interrogated is determined by the input to the digital light deflector under the control of the control circuit 22. For an input of 0, 1, detector 20 detects the presence of (relatively low intensity) light of a frequency $f1$ under the control of control circuit 22. For an input of 1, 1, detector 20 detects a null.

For an erase operation, the intensity of light from source 11 need not be reduced to below a threshold for writing because the storage area $a^2$ is not accessed during this operation. During the erase operation, light issues from source 11 at the positions indicated by the circles in areas *ab* and *ba* of FIGS. 1 and 6. An input setting of 0, 1 on the digital light deflector directs the beam at the position of the circle in area *ab* to that of the circle 0, − of area *ab* in FIG. 4. Thus, a photoconductor PCY of a Y conductor corresponding to location 0, 1 is selected. Similarly, that setting directs a beam at the position of the dot in area *ba* to that of the circle −, 1 in area *ba* of FIG. 4. Therefore, a photoconductor PCX of an X conductor corresponding to location 0, 1 is selected. Consequently, the voltage across location 0, 1 is reduced and sustaining light from source 15 is extinguished at that location. Erasure at other locations is in the same manner. Importantly, the address of coordinate X and Y conductors for a selected location corresponds to the address for that location. Note that other locations along the selected X and Y conductors have the voltages therecross "half-reduced." That half-reduction of voltage is insufficient to erase.

Figure 7:
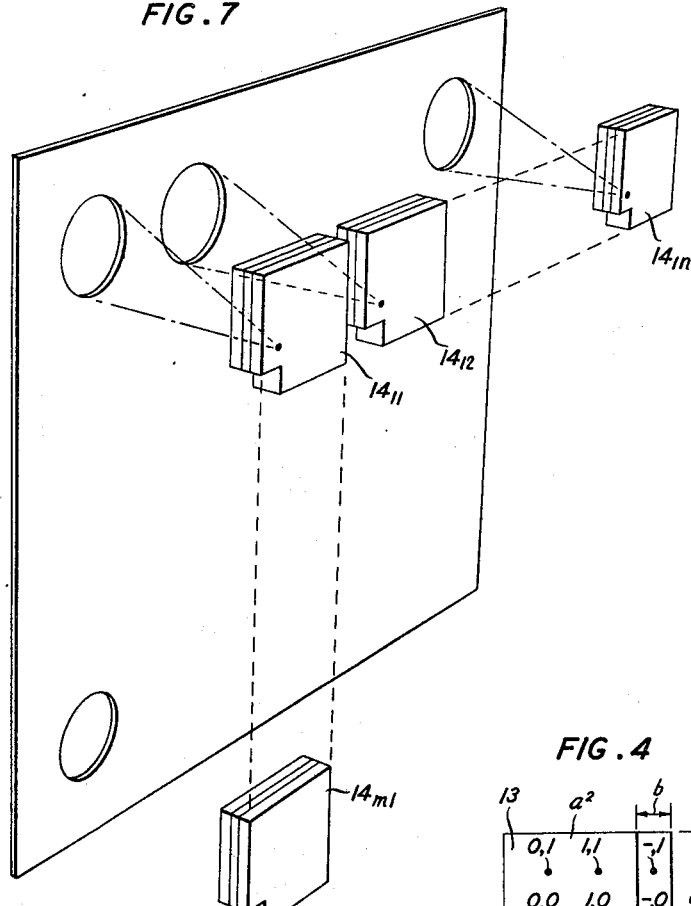
FIG. 7 is a schematic illustration of the word-organization of the memory of FIG. 1.

It is contemplated, in accordance with this invention, that the memory of FIG. 1 may be word-organized. This is to say, selection light from source 11 may be directed simultaneously to a corresponding location on each of a plurality of storage units 14. Such an arrangement is descriptively termed paralleling and is implemented conveniently by employing a plurality of lenses in a plane between the digital light deflector and a storage unit 14 as shown in FIG. 7. A corresponding plurality of storage units $14_{11}$, $14_{12}$ . . . $14_{mn}$ then would be disposed in a plane oriented as is further shown in FIG. 7. Each of the plurality of storage units of such an arrangement is accompanied by a detector 20, not shown. Paralleling in a transmitting mode is described in Large-Capacity Memory Techniques for Computing Systems, M. C. Yovits, MacMillan, 1962, p. 79 et seq., in an article entitled "The Flying Spot Store" by C. W. Hoover, Jr. and G. Haugk. Paralleling in a reflection mode is described, for example, in copending application Ser. No. 438,021, filed Mar 8, 1965, for K. D. Bowers and L. J. Varnerin, Jr., now Patent No. 3,403,261.

What has been described is considered only illustrative of the principles of this invention. Accordingly, other and different arrangements according to the principles of this invention may be devised by one skilled in the art without departing from the spirit and scope of this invention.

What is claimed is:

1. A storage unit comprising a sandwich structure including a photoconductive film, a polarizing film and an electrooptic film in that order; a plurality of first conductors contiguous said photoconductive film, a plurality of second conductors contiguous said electrooptic film, means including said first and second conductors for providing a voltage difference through said sandwich structure at crosspoints between said first and second conductors, said last-mentioned means also including a first resistance in series with each of said first and second conductors and means for lowering said first resistances selectively for reducing the voltage difference between coordinate pairs of said first and second conductors.

2. A storage unit in accordance with claim 1 wherein each of said first and second conductors also includes a photoconductor portion.

3. A storage units in accordance with claim 2 wherein each of said first and second conductors includes a second resistance in parallel with the photoconducting portion and corresponding resistance.

4. A storage unit in accordance with claim 3 in which said second resistance is relatively large with respect to the corresponding said first resistance.

5. An optical memory comprising a sandwich arrangement of a photoconductive film, a polarizing film and an electrooptic film in that order, a set of Y conductors adjacent said photoconductive film, a set of X conductors adjacent said electrooptic film, each of said X and Y conductors including a photoconductor portion, means for providing a voltage difference between said X and Y conductors, and first optical means for illuminating said photoconductor portions in coordinate pairs for reducing the voltage difference through said sandwich arrangement at a position corresponding to said coordinate pairs of conductors.

6. An optical memory in accordance with claim 5 wherein said first optical means comprises a digital light deflector including X deflection and Y deflection stages, each of said X deflection stages including therein an optical element oriented orthogonal to the optical path therethrough, said optical element having a Y dimension longer than the X dimension thereof, and each of said Y deflection stages including therein a similarly oriented optical element having the X dimension longer than the Y dimension thereof.

7. An optical memory in accordance with claim 6 wherein said first optical means also includes a source of light, first means for directing said light selectively to a location of said storage unit defined by the crosspoint of coordinate X and Y conductors, and second means for directing said light simultaneously to the photoconductor portions of coordinate pairs of X and Y conductors.

8. An optical memory in accordance with claim 5. wherein said first optical means comprises a digital light deflector including X deflection and Y deflection stages and means for selectively direction said light in first and second simultaneous beams only through the X deflection stages and only through the Y deflection stages respectively.

9. An optical memory in accordance with claim 8 wherein said first optical means provides a beam of light of a frequency $f1$ and having a first intensity for reducing the resistance of a selected portion of said photoconductive film to provide said voltage across said electrooptic film there, said memory including second optical means for directing polarized light at said electrooptic film, said polarizing film having a polarization direction orthogonal to that of said polarized light, said polarized light having its polarization direction rotated for passage through said polarizing film where said voltage is applied across the electrooptic film.

10. An optical memory in accordance with claim 9 including a detector adjacent said electrooptic film for detecting the passage of light of a frequency $f1$ therethrough.

11. An optical memory in accordance with claim 10 wherein said second optical means is separated from said storage unit by a filter to exclude light of a frequency $f1$, and said detector is separated from said sandwich structure by a filter to exclude all light but light of a frequency $f1$.

12. An optical memory in accordance with claim 9 including a plurality of said storage units, means directing said beam from said first optical means at corresponding locations in each of said storage units, and a detector adjacent the electrooptic film of each storage unit for detecting the passage of light of a frequency $f1$ therethrough.

References Cited

UNITED STATES PATENTS

| | | | |
|---|---|---|---|
| 3,121,866 | 2/1964 | Barditch | 340—347 |
| 3,165,634 | 1/1965 | Raymond | 250—219 |

FOREIGN PATENTS

| | | |
|---|---|---|
| 690,897 | 7/1964 | Canada. |

OTHER REFERENCES

R. M. Schaffert: "Photostorage System," IBM T.D.B., vol. 5, No. 3, August 1962, pp. 54–56.

TERRELL W. FEARS, Primary Examiner

H. L. BERNSTEIN, Assistant Examiner

U.S. Cl. X.R.

250—219; 350—150